United States Patent [19]

Mathues

[11] 4,300,363
[45] Nov. 17, 1981

[54] TORSIONAL VIBRATION DAMPER FOR A FRICTION CLUTCH

[75] Inventor: Thomas P. Mathues, Miamisburg, Ohio

[73] Assignee: General Motors Corporation, Detroit, Mich.

[21] Appl. No.: 99,486

[22] Filed: Dec. 3, 1979

[51] Int. Cl.³ .............................................. F16D 3/14
[52] U.S. Cl. .................................. 64/27 NM; 64/12; 192/55; 192/106.1
[58] Field of Search ................... 64/12, 27 NM, 27 R, 64/24; 192/55, 106.1

[56] References Cited

U.S. PATENT DOCUMENTS

| | | | |
|---|---|---|---|
| 1,591,242 | 7/1926 | Simpson | 64/12 |
| 2,858,855 | 11/1958 | Picanol | 64/12 |
| 3,043,164 | 7/1962 | Sundt | 64/12 |
| 3,877,259 | 4/1975 | Bishop | 64/27 NM |
| 4,118,953 | 10/1978 | Kavolelis et al. | 64/12 |
| 4,252,227 | 2/1981 | Staub, Jr. | 64/27 NM |

Primary Examiner—Charles J. Myhre
Assistant Examiner—Magdalen Moy
Attorney, Agent, or Firm—Donald F. Scherer

[57] ABSTRACT

A torsional vibration damper has an input hub and an output hub drivingly connected by a plurality of elastomeric band support members and an elastomeric band. The support members are maintained in contact with at least one of the hubs by the elastomeric band. The band permits relative angular movement between the hubs in response to a camming action which is transmitted to the elastomeric band by the support members. The relative angular displacement between the input and output members increases as the base level of torque transmission increases while slight relative movements from the base torque level setting are operative to attenuate and dampen the torsional disturbances which are imposed on the input hub by a prime mover such as an internal combustion engine.

4 Claims, 6 Drawing Figures

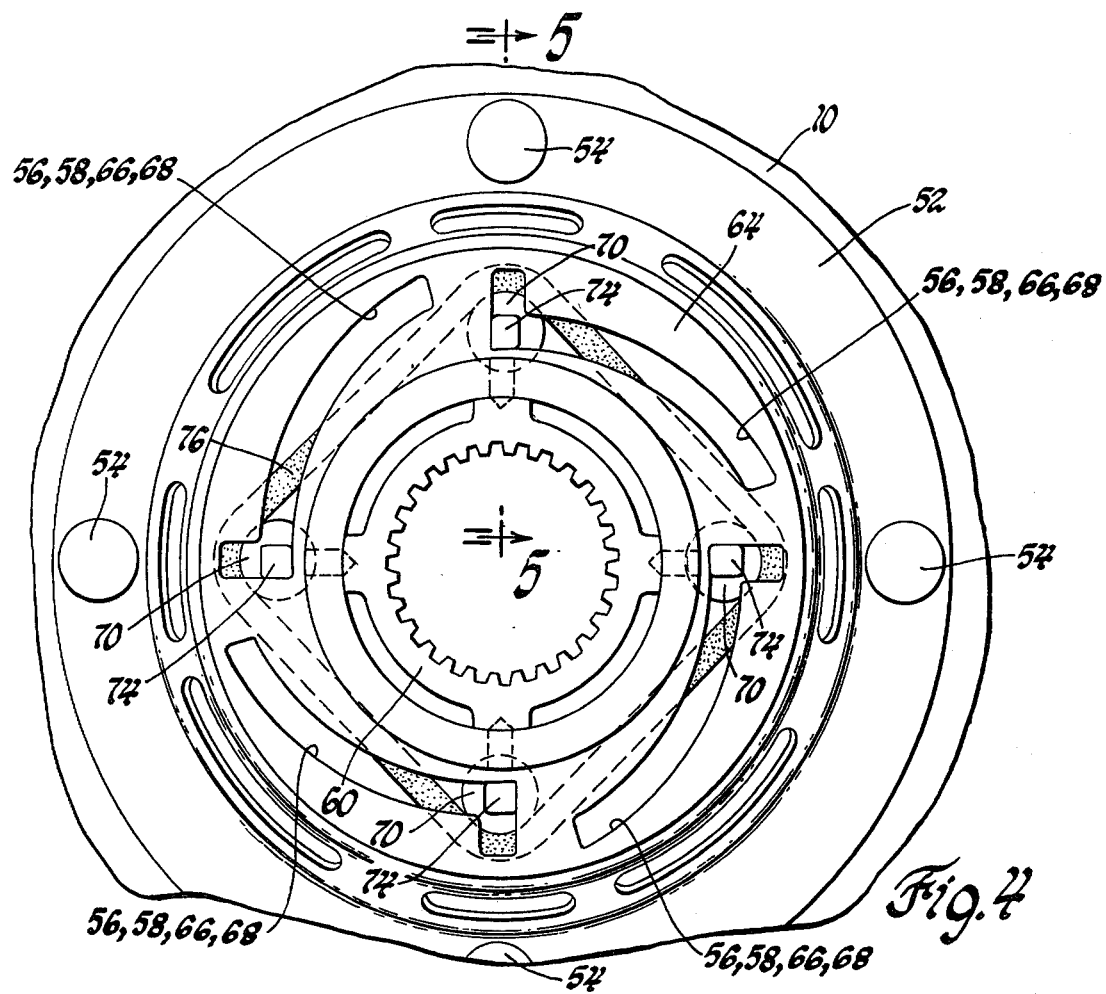
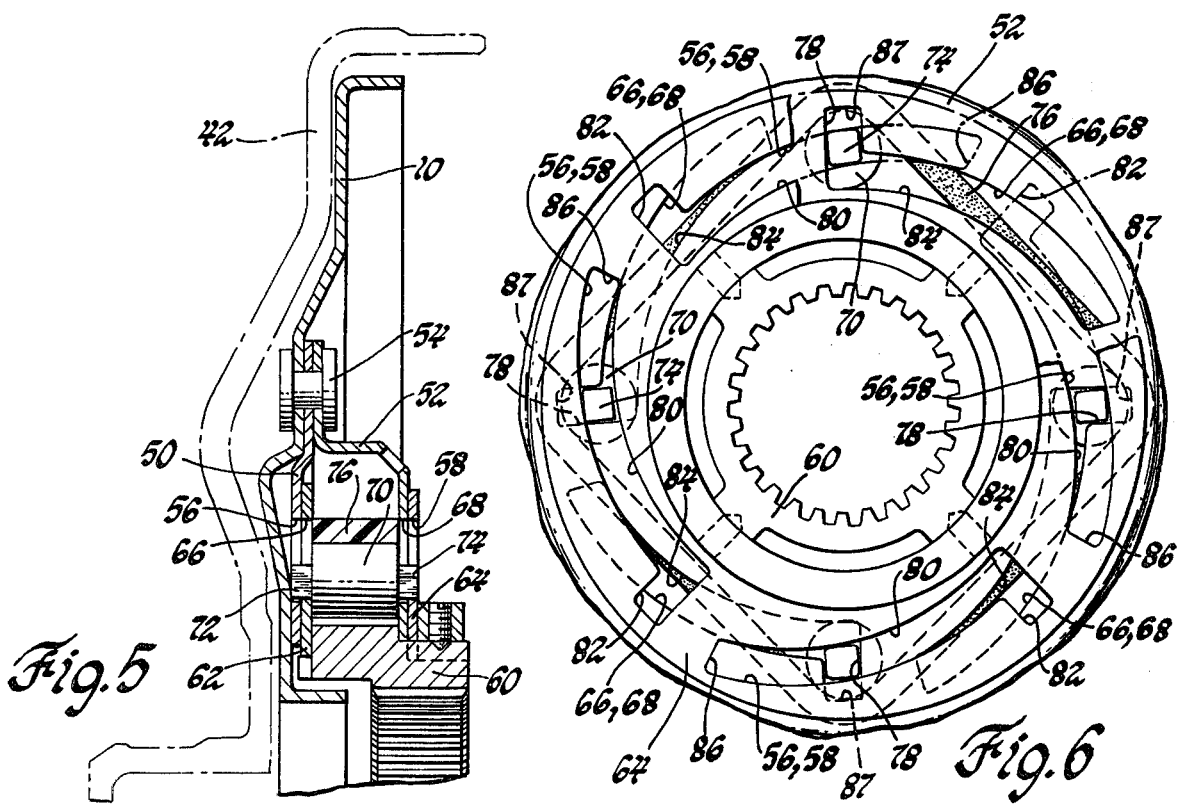

TORSIONAL VIBRATION DAMPER FOR A FRICTION CLUTCH

This invention relates to vibration dampers and more particularly to vibration dampers having an elastomeric band member operable to assist in the transmission of torque between the input and output members of a vibration damper.

It is an object of this invention to provide an improved torsional vibration damper having an elastomeric band member operable to permit angular displacement between the input and output members of the vibration damper.

It is another object of this invention to provide an improved torsional vibration damper having an elastomeric band member responsive to a camming action caused by angular displacement between the input and output members of the damper to increase the torque transmission capacity and simultaneously dampen torsional disturbances imposed on the input member.

It is a further object of this invention to provide an improved torsional vibration damper having a plurality of band support members which are drivingly connected between the input and output members of the damper and are maintained in torque transmitting relationship therewith by an elastomeric band member which continuously urges the support members radially inward.

It is yet another object of this invention to provide an improved torsional vibration damper wherein an input member and an output member are drivingly connected through a plurality of support members and an elastomeric band and wherein the support members are guided in a slot on one member and urged radially outward by a cam surface on the other member so as to affect the tension in the elastomeric band member and thereby control the torque transmitting capacity of the damper.

These and other objects and advantages of the present invention will be more apparent from the following description and drawings in which:

FIG. 4 is an elevational view of another embodiment of the invention;

FIG. 5 is a view taken along line 5—5 of FIG. 4; and

FIG. 6 is a view showing a portion of FIG. 4 in a different operative position.

Figure 1:
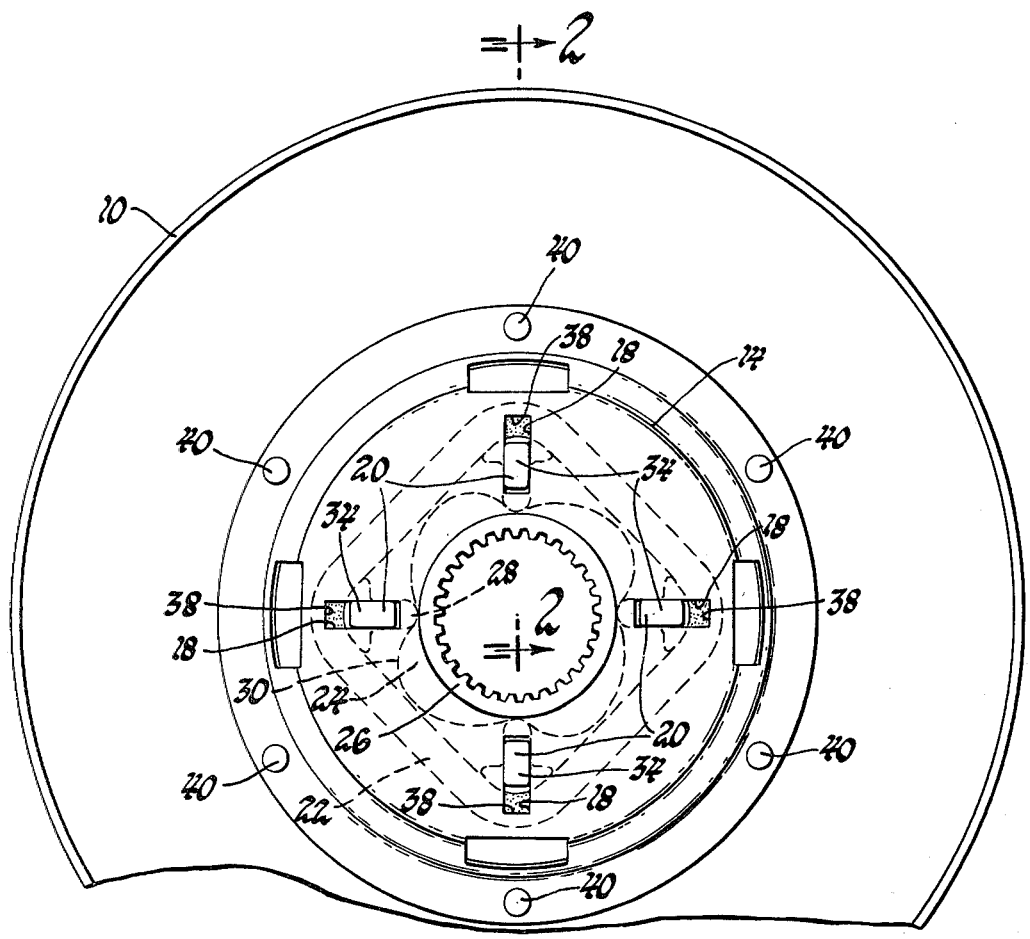
FIG. 1 is an elevational view of one embodiment of a vibration damper incorporating the present invention.

Referring to the drawings, wherein like characters represent the same or corresponding parts throughout the several views, there is seen in FIG. 1, a clutch pressure plate or input disc member 10, which has secured thereto a pair of sheet metal housing members 12 and 14. Each of the housings 12 and 14 have a plurality of radial guide slots 16 and 18, respectively. The members 12 and 14 cooperate to form an annular housing in which is disposed a plurality of band support members 20 and an elastomeric band 22. Also disposed in the annular space provided by housings 12 and 14, is a cam portion 24 of an output hub or disc 26.

Figures 2, 3:
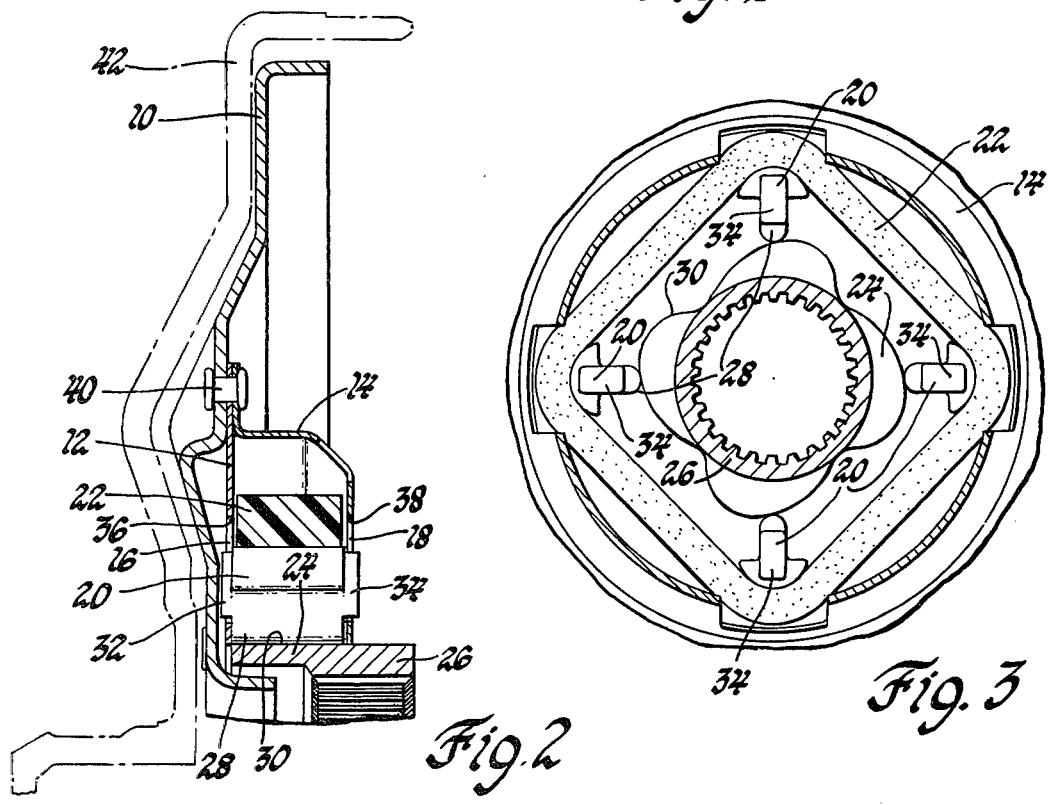
FIG. 2 is a view taken along line 2—2 of FIG. 1.
FIG. 3 is a view showing a portion of FIG. 1 with the damper in a different operative position.

As can best be seen in FIGS. 1 and 2, the support members 20, each have a rounded end 28 which is held in abutment with a corresponding cam surface 30 formed on cam portion 24. The elastomeric band 22 is effective to maintain the contact between end 28 and its respective cam surface 30. Each band support member 20 also has a pair of shoulder portions 32 and 34 which are disposed to be guided in the slots 16 and 18, respectively. Each slot 16 and 18 has a respective radial outward end surface 36 and 38 which serve to limit the radial outward movement of the band support members 20.

The clutch pressure plate 10 is a conventional disc-type member to which the housings 12 and 14 are riveted at a plurality of locations such as 40. The clutch pressure plate 10 preferably is engageable with a torque converter input shell, shown in phantom lines at 42. The input shell 42 is a conventional torque converter member and may be constructed in accordance with any of the known methods of construction for such members. The clutch pressure plate 10 can be brought into frictional engagement with the input shell 42 in the manner shown in U.S. Pat. No. 3,252,352 issued to General et al, such that torque is transmitted from the input shell 42 to the clutch pressure plate 10 in a well-known manner. It is also known that in such systems, some torsional vibration is imposed on the input shell from the internal combustion engine to which it is connected.

Torque is transmitted from the pressure plate 10 to the output hub 26. This torque transmission must pass through the band support members 20. As the basic torque transmitted increases, the pressure plate or input disc 10 will rotate or will be angularly displaced relative to the output hub 26. Such relative angular displacement results in the support members 20 being forced radially outward by cam surface 30 thereby creating an increase in tension in the elastomeric band member 22. Thus, the amount of relative angular displacement is determined by the basic or DC level of torque transmission. However, as is well-known, there will be some torsional disturbances or AC level of torque, which is also imposed on the pressure plate 10. The elastomeric band member 22 will permit the pressure plate 10 to rotate relative to the output hub 26 from the DC torque level and return without transmitting the AC torque disturbances.

If the basic or DC torque level exceeds a predetermined value, the shoulders 32 and 34 will abut the surfaces 36 and 38, respectively, such that further radial outward movement cannot occur and a mechanical drive connection is attained between the clutch pressure plate 10 and the output hub 26. Thus, if the damping system is overloaded or for some reason the elastomeric member 22 fails to operate, a mechanical drive is available.

The cam surface 30, as is seen in FIGS. 1 and 3, will provide a slow rise on forward drive and a rapid rise on reverse drive. Thus, when the vehicle is driving the engine and torsional vibration damping is not a significant factor, the relative displacement between the input and output members of the vibration damper will reach their maximum capacity with less angular displacement.

The vibration damper shown in FIGS. 4 and 6 function in basically the same manner as that described above for FIGS. 1 through 3, however, the camming action and the structure is slightly different. The damper shown in FIGS. 4 through 6 have essentially the same clutch plate or input member 10, as shown in FIG. 1. The vibration damper is enclosed in an annular housing formed by housing members 50 and 52 which are riveted to the pressure plate 10 at a plurality of locations such as 54. The housing members 50 and 52 each have formed therein a plurality of generally L-shaped slots 56 and 58, respectively. An output member 60 has secured thereto a pair of discs 62 and 64 which also have a plurality of L-shaped slots 66 and 68, respectively. As seen in FIG. 4, the L-shaped slots 56, 58, 66 and 68 are circumferentially and axially aligned.

A plurality of band support members 70 each having a pair of shoulders 72 and 74 are disposed within the housing members 50 and 52. The support members 70 are encompassed by and urged inwardly by an elastomeric band member 76. The shoulder 72 is disposed in L-shaped slots 56 and 66 while the shoulder 74 is disposed in slots 58 and 68. As best seen in FIGS. 4 and 6, the shoulders 72 and 74 are essentially square in cross section such that they will not rotate relative to the L-shaped slots. Thus, the action between the support member 70 and the elastomeric band member 76 will be linear and there will be no tendency for angular displacement of the support members 70 relative to the band 76.

The vibration damper is effective to transmit torque from the pressure plate 10 to the output hub 60. As torque is transmitted therebetween, the clutch pressure plate 10 will be displaced angularly relative to the output hub 60 and therefore, as seen best in FIG. 6, the L-shaped slots 56 and 66 will be displaced relative to the L-shaped slots 58 and 68. As the relative displacement occurs, the shoulders 72 and 74 will be moved radially outward in the short leg guide portion 78 of slots 66 and 68. This radial outward movement is occasioned by the inner surface 80 of slots 56 and 58. It will be appreciated, as seen in FIGS. 4 and 6, that the inner surface 80 progresses radially outward as it extends from the short leg guide portion 82 of L-shaped slots 56 and 58. The same is true of the inner surface 84 of L-shaped slots 66 and 68.

Thus, during the transmission of torque in the forward direction, the surface 80 serves as a cam surface to urge the support member 70 radially outward with increasing torque transmission. When the ends 86 or 87 of slots 56 and 58 or 66 and 68, respectively, abut the shoulders 72 and 74, a mechanical drive connection is attained between the clutch pressure plate 10 and the output member 60 such that further angular displacement therebetween cannot occur. This mechanical drive connection occurs only if the maximum troque capacity of the damper is surpassed or upon failure of the elastomeric band or support members. Therefore, in normal operation, the drive torque will all be transmitted through the support members 70 such that the elastomeric band member 76 will attenuate or dampen the AC torsional signals.

During coast drive, the shoulders 72 and 74 will extend radially outward in the short leg portion 82 of slots 56 and 58. This movement is enforced by the radial inner surface 84 of L-shaped slots 66 and 68. If it is desired to have different relative angular displacements between forward drive and coast drive, the L-shaped slots 66 and 68 or 56 and 58 can be varied to permit the mechanical drive condition to be occasioned with much less angular displacement in one drive direction as compared to the other.

It should be noted that in the vibration dampers described above, that the elastomeric bands 22 and 76 undergo tension loading only. That is to say that support members 20 and 70 do not rotate during the linear motion of their respective shoulder portions in their respective radial slots. It has been found that the life of the elastomeric band member can be increased if rotation of the support or sliding of the band across the support is eliminated, since the relative motion creates stresses which result in fatiguing of the band member.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A torsional vibration damper comprising an input member; an output member; an input disc drivingly connected to said input member; an output disc drivingly connected to said output member; cam slot means formed in each of said input disc and said output disc; band support means operatively connected between said input and output discs and including shoulder means disposed in said cam slots; and elastomeric band means operatively connected to said band support means for transmitting a force between said disc members through said cam slot means and for permitting relative rotation between said input and output disc means whereby relative rotational movement of said cam slot means results in radial movement of said band support means relative to said input and output discs accompanied by an increase in the force transmitted by said elastomeric band means when said elastomeric band support means move radially outward relative to said disc members.

2. A torsional vibration damper comprising an input member; an output member; cam means formed on one of said members; guide slot means formed in the other of said members; band support means operatively connected with said cam means and including shoulder means slidably disposed in said guide slots; and elastomeric band means tensioned to be operatively connected about said band support means for urging said band support means into abutment with said cam means and thereby establish a resilient drive connection between said input and output member, and for permitting relative rotation between said input and output members whereby rotational movement of said cam means relative to said band support means results in radial movement of said band support means relative to said input and output members accompanied by a change in the tension in said elastomeric band means.

3. A torsional vibration damper comprising an input member; and output member; an output hub drivingly connected to said output member; cam means formed on said output hub; radial slot means formed in said input member; band support means operatively connected between said input and output discs and including shoulder means disposed in said radial slot means; and elastomeric band means tensioned and circumscribing said band support means for imposing a force on said band support means to maintain said band support means in abutment with said cam slot means, and said elastomeric band means being resilient to permit radial movement guided by said radial slot means thereby permitting relative rotation between said input member and said output member to accommodate various levels of torque transmission and to also accommodate torsional disturbances imposed on said input member.

4. A torsional vibration damper comprising an input member; an output member; a vibration damper housing drivingly connected to said input member; cam means formed in one of said vibration damper housing and said output member; radial guide slots formed in the other of said vibration damper housing and said output member; band support means operatively connected between said vibration damper housing and said output member and including shoulder means disposed in said radial guide slots and a surface in abutment with said cam means; and elastomeric band means operatively connected to said band support means for transmitting a force between said members through said cam means and said radial guide slots and said elastomeric band means permitting relative rotation between said input and output members whereby arcuate movement of said cam means relative to said band support means results in radial movement of said band support means relative to said input and output members accompanied by a change in the force transmitted by said elastomeric band means.

* * * * *